United States Patent [19]

Bleasdale

[11] Patent Number: 5,747,142
[45] Date of Patent: May 5, 1998

[54] FORMER FOR CORE SANDWICH IN COMPOSITE REINFORCED PLASTICS

[75] Inventor: Desmond Harold Bleasdale, Brookvale, Australia

[73] Assignee: Form-Rite Plastics Development Pty., Ltd., New South Wales, Australia

[21] Appl. No.: 513,947

[22] PCT Filed: Mar. 8, 1994

[86] PCT No.: PCT/AU94/00106

§ 371 Date: Oct. 20, 1995

§ 102(e) Date: Oct. 20, 1995

[87] PCT Pub. No.: WO94/20290

PCT Pub. Date: Sep. 15, 1994

[30] Foreign Application Priority Data

Mar. 8, 1993 [AU] Australia ............ PL7688

[51] Int. Cl.⁶ .......................... B32B 3/28
[52] U.S. Cl. .............. 428/167; 428/131; 428/178; 428/118
[58] Field of Search .......... 428/167, 182, 428/172

[56] References Cited

U.S. PATENT DOCUMENTS

| | | | |
|---|---|---|---|
| 3,899,805 | 8/1975 | McMillan | 24/213 |
| 4,027,058 | 5/1977 | Wooten | 428/36 |
| 4,906,508 | 3/1990 | Blankenburg et al. | 428/116 |
| 5,364,686 | 11/1994 | Disselbeck et al. | 428/174 |
| 5,451,377 | 9/1995 | Asher | 428/178 |

FOREIGN PATENT DOCUMENTS

| | | |
|---|---|---|
| 487945 | 5/1991 | European Pat. Off. . |
| 514616A1 | 5/1991 | European Pat. Off. . |
| 512431A1 | 4/1992 | European Pat. Off. . |
| 552748 | 1/1993 | European Pat. Off. . |
| 2666541 | 9/1990 | France . |
| 266541 | 3/1992 | France . |
| 9011888 | 4/1990 | WIPO . |

*Primary Examiner*—Donald Loney
*Attorney, Agent, or Firm*—Morton J. Rosenberg; David I. Klein

[57] ABSTRACT

A former for use in a core sandwich of composite reinforced plastics material, the former comprising a rib section (5) divided into a plurality of sub-sections (8) by slits or openings (10) extending partway through said rib section (5) to define a hinge or web section (11) between each adjacent sub-section. A sheet former (22) may be produced by a number of parallel rib sections (5) each joined to adjacent rib sections by a flexible bridge portion (20) to define openings (25) in the former between each bridge portion (20) and the rib sections (5) and/or sub-sections (8). Venting between the sub-sections (8) may be provided by a venting channel (21) formed in the bridge portion (20). An array of upstanding formations (30) each joined at their base 31 by a flexible bridge portion (20) to produce a former sheet (22) is also disclosed. The bridge portion (20) allows venting between these formations through a channel (21) and allows bonding through openings (25) in the sheet (22).

16 Claims, 16 Drawing Sheets

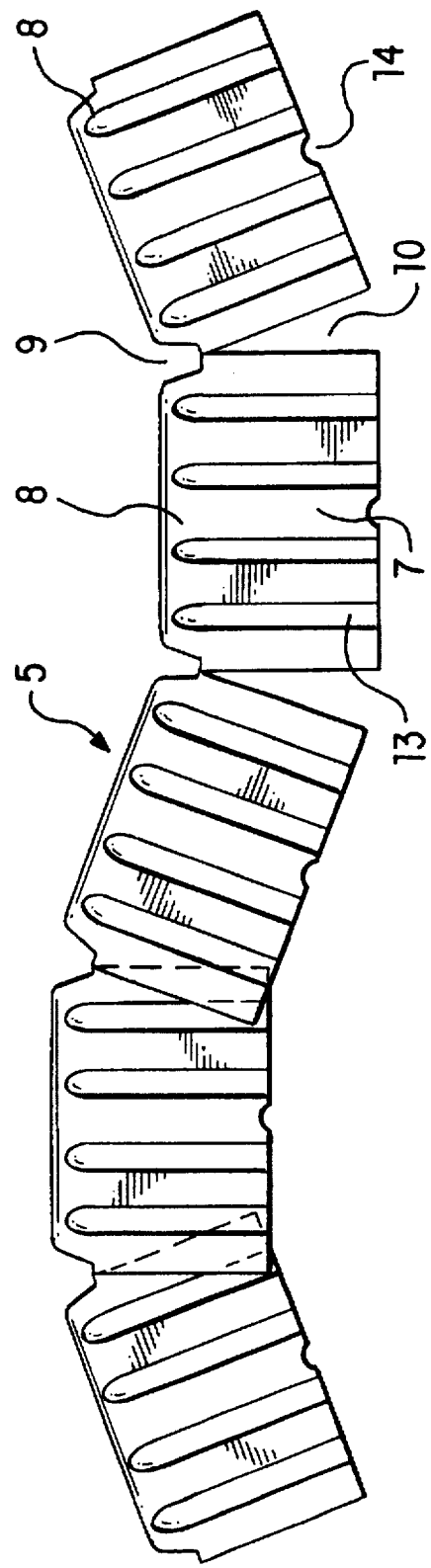
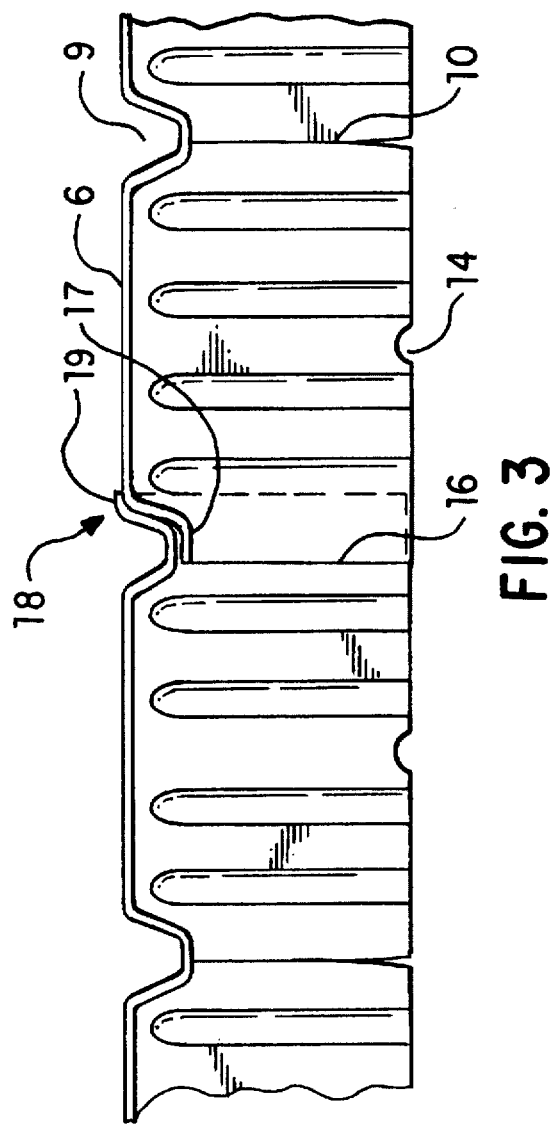
FIG. 2
FIG. 3

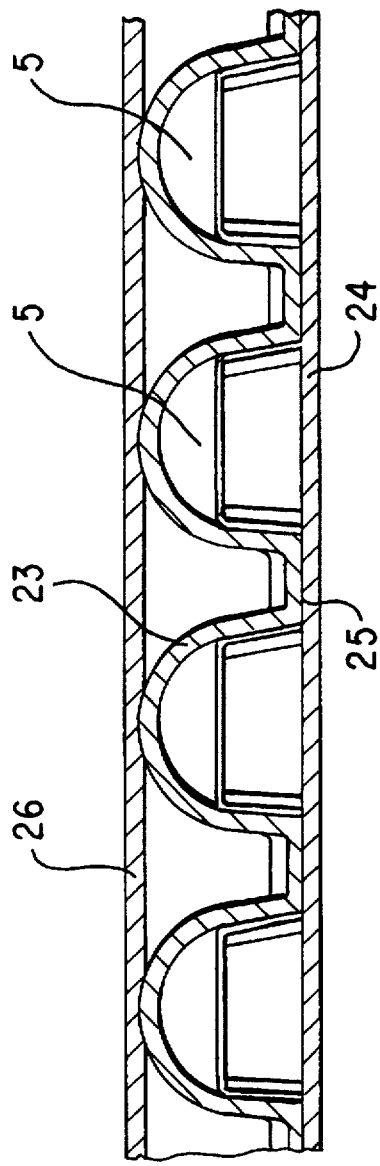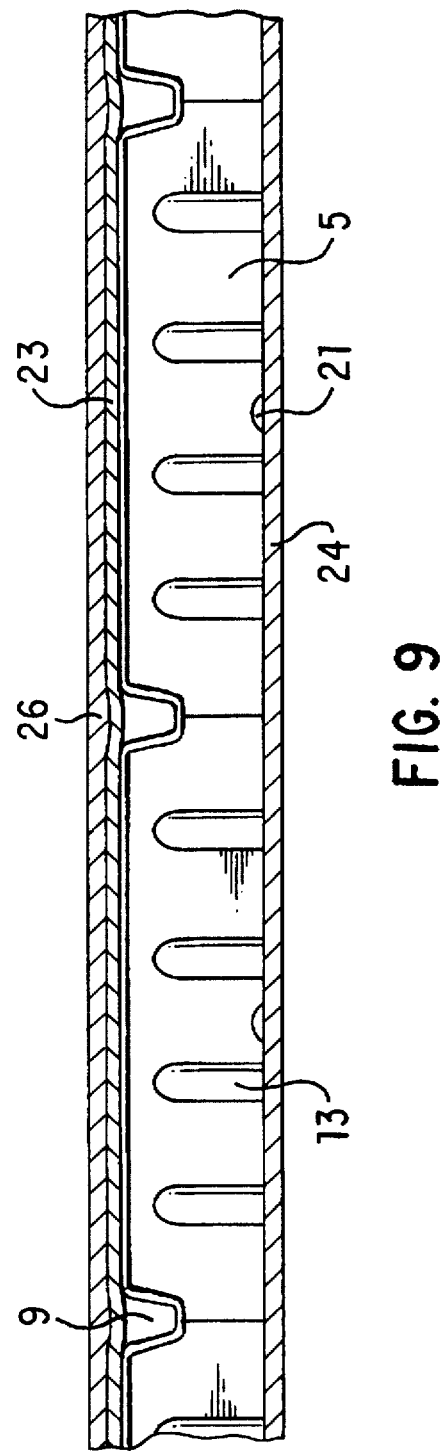

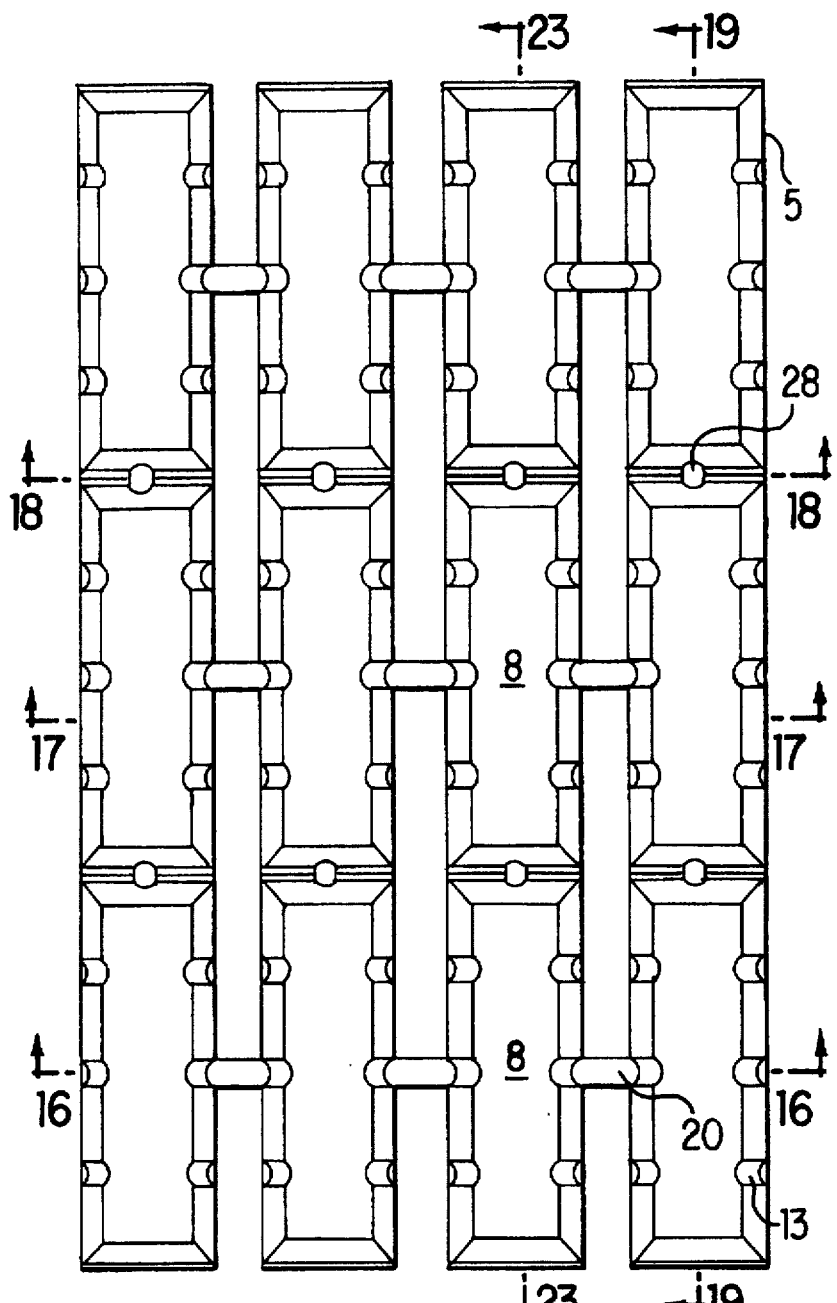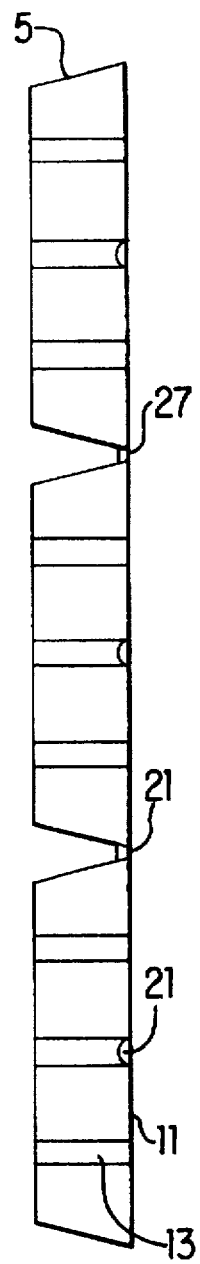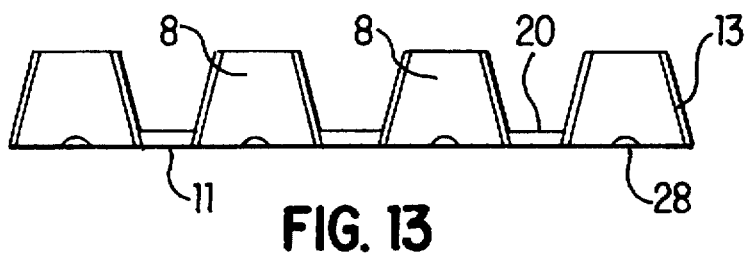
FIG. 12
FIG. 14
FIG. 13

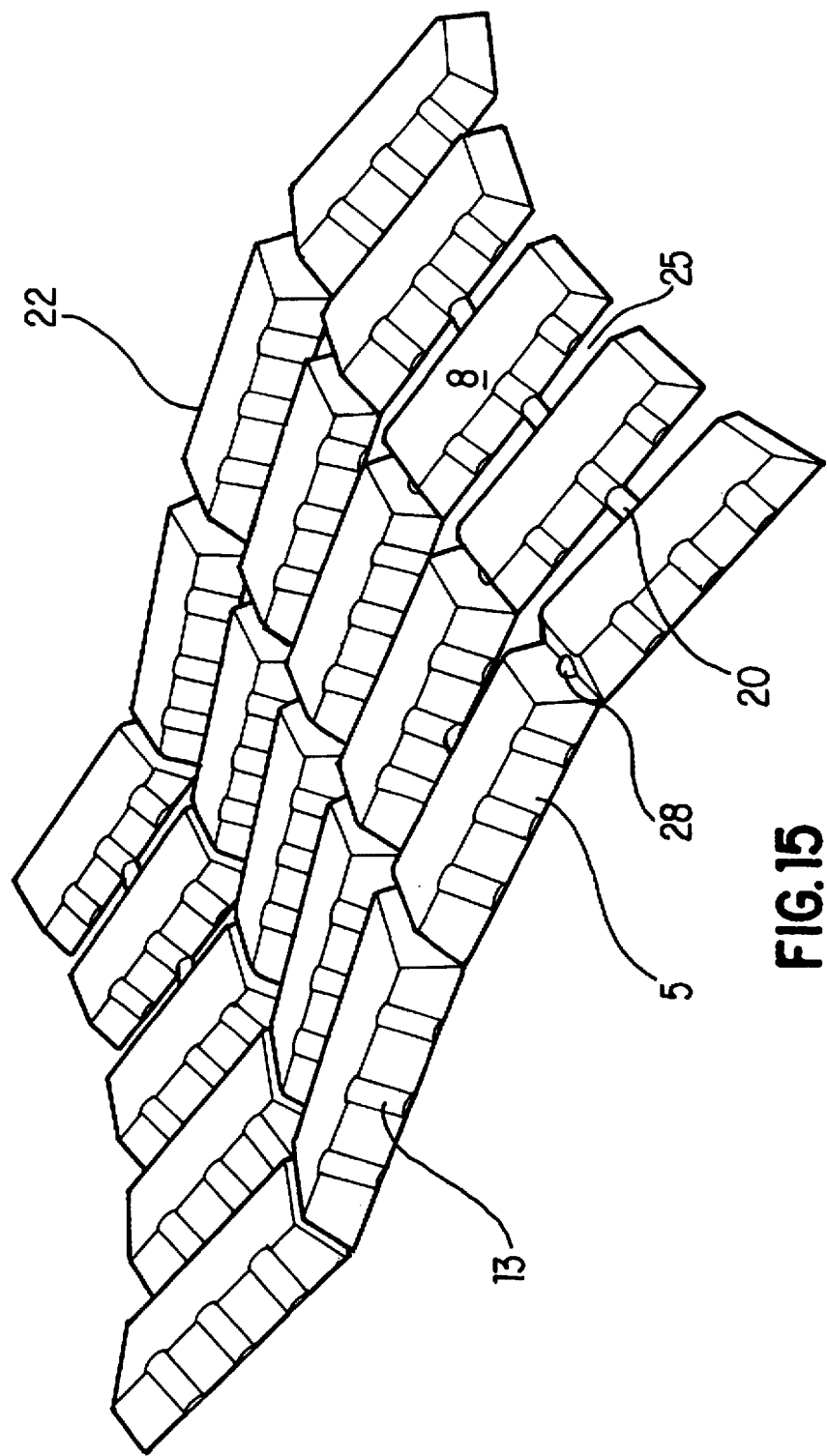

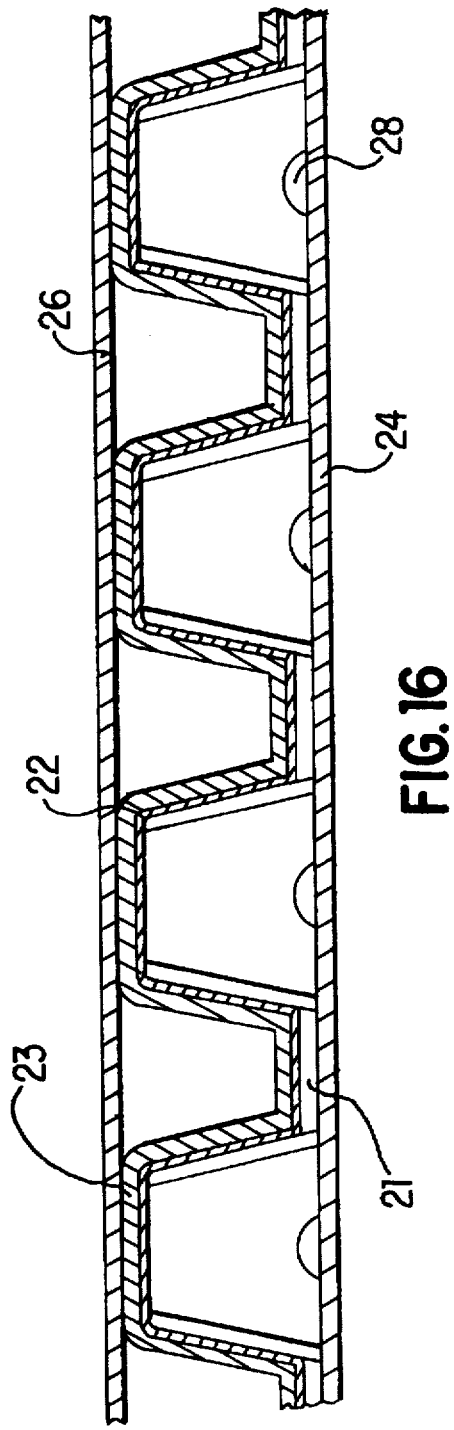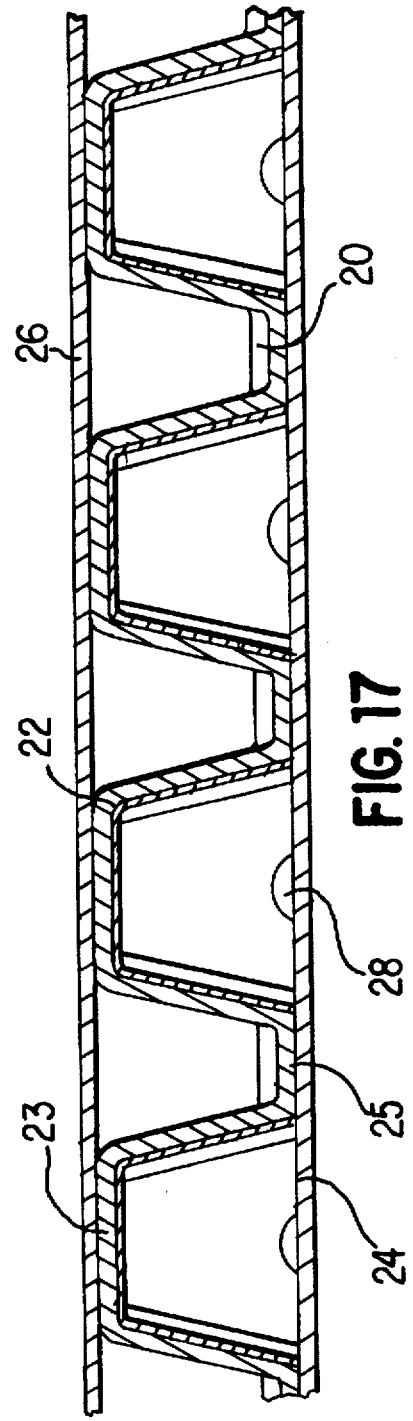

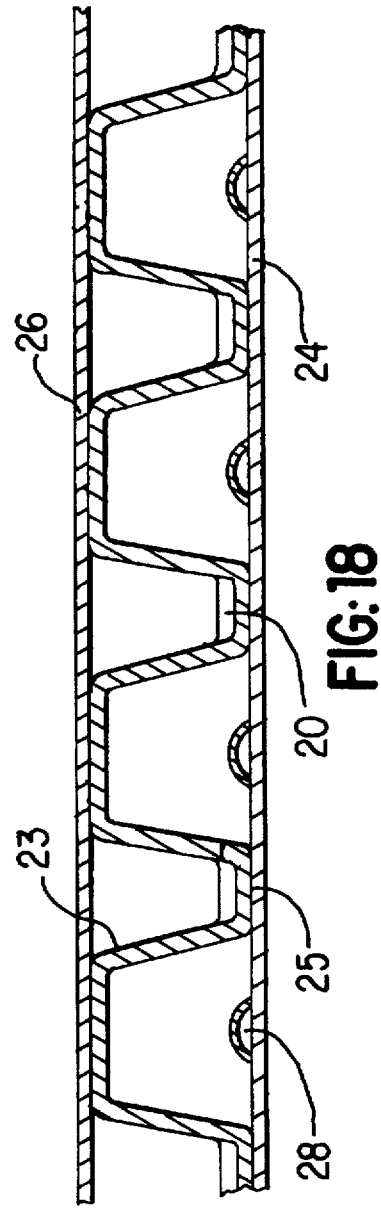
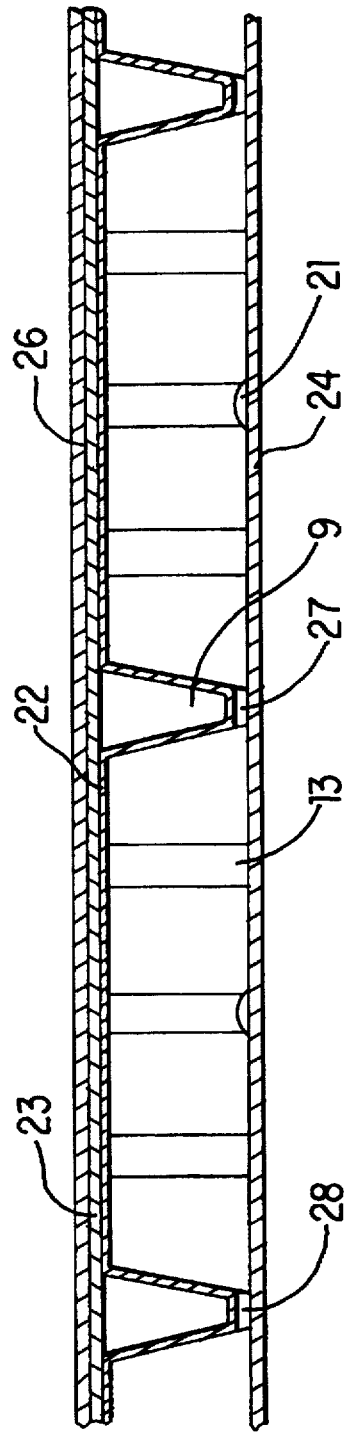

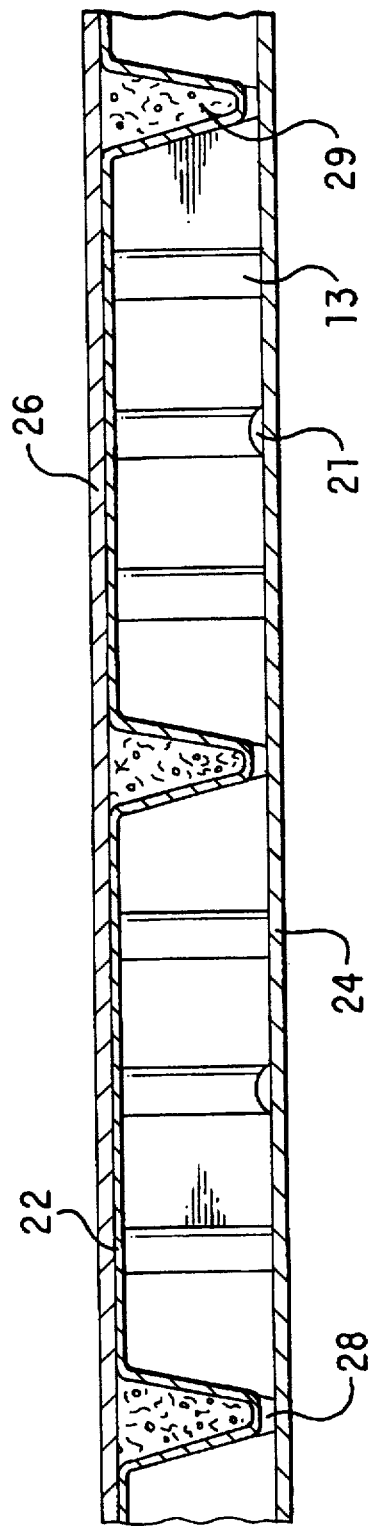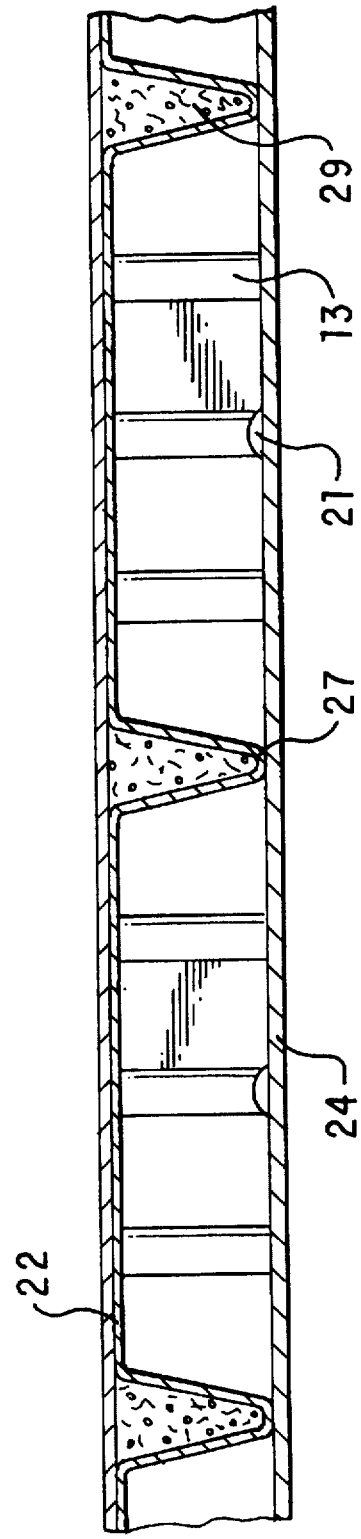

FORMER FOR CORE SANDWICH IN COMPOSITE REINFORCED PLASTICS

TECHNICAL FIELD

The present invention relates to a former used for manufacture of articles of composite reinforced plastics material.

BACKGROUND ART

Articles of fibre reinforced material, including hollow stiffening ribs, and/or core materials, may be made by "laying up", that is to say by placing a layer of woven or non-woven reinforcing fibres upon a mould surface and then impregnating that layer with the hard setting plastic material while in a liquid or pasty state and subsequently allowing, or causing the plastic to set.

Composite structures frequently rely on ribs, or core materials to increase their strength and rigidity. These are generally applied to one side whilst the composite is being "layed up" over the desired mould surface. Many items are used to form the rib sections, that is, paper, cardboard tubes, timber, plastic, foam materials etc. A foraminous sheet with spaced apart arched sections with holes between is another method.

Core materials are frequently used and consist of plastic foam, plywood, timber, end grain balsa or similar.

DISCLOSURE OF THE INVENTION

The present invention seeks to provide an improvement over the prior art by use of a sheet of material as the former, creating the core of a sandwich structure of mouldings or panels.

According to a first aspect, the present invention provides a former for use in a core sandwich of composite reinforced plastics material, the former comprising a plurality of parallel rib sections each joined to adjacent rib sections by a flexible bridge portion to define openings in the former between each bridge portion and the rib sections, each rib section being divided into a plurality of sub-sections by a depression or groove formed in an upper surface of the rib section, the base of the groove forming a hinge or web section between each adjacent sub-section and having slits or openings in the side walls of the rib section extending between the base of the rib section and the base of each groove.

According to a second aspect, the present invention provides a former for use in a core sandwich of composite reinforced plastics material, the former comprising a plurality of parallel rib sections each joined to adjacent rib sections by a flexible bridge portion to define openings in the former between each bridge portion and the rib sections, each rib section being divided into a plurality of sub-sections by a depression or groove formed in an upper surface of the rib section and extending to the base of the rib section, the base of the groove forming a hinge or web section between each adjacent sub-section.

According to a third aspect, the present invention provides a former for use in a core sandwich of composite reinforced plastics material, the former comprising a sheet having an array of upstanding formations formed therein and each joined to an adjacent formation by a flexible bridge portion to define openings in the sheet of the former between each bridge portion and the upstanding formations.

For preference, the former is integrally formed, preferably from a sheet of material.

Preferably, the bridge portion is shaped to provide a venting channel between adjacent rib sections or formations.

For preference, the bridge portion is arcuate or angular in cross section to provide the venting channel.

For preference, the walls of the rib sub-sections or upstanding formations are provided with stiffening formations. These formations may be in the form of grooves or ridges. Similar stiffening formations may be provided on the upper surfaces of the rib sections or formations if desired. Preferably, the ends of the former are shaped to enable joining in a complementary fashion with the ends of further like formers.

To allow small dimensional alterations and flexibility, the former sheet is preferably segmented and joined together in such a manner that each segment is vented to the other and cut out between. This simplifies the method by which compound curving of the sheet may be achieved on a curvaceous surface.

The venting between sections is an optional refinement which may be an important feature when the core sandwich construction is used in applications related to gases, liquids and/or dangerous substances which may be flammable, noxious, volatile or toxic. This option ensures the integrity of either face can be tested for leaks within the core structure.

The former sheet may be made of any suitable material, that is, paper mache, compressed fabric, woven materials or natural or synthetic sheeting. The preferred form is a thin film of rigid plastic.

BRIEF DESCRIPTION OF THE DRAWINGS

Embodiments of the present invention will now be described, by way of example only, with reference to the accompanying drawings in which:

FIG. 2 is a side elevation view of the rib section of FIG. 1 illustrating the flexing movement of the rib section;

FIG. 3 is an enlarged side elevation of the joint between two rib sections of the type shown in FIG. 1;

FIG. 8 is sectional view through 8—8 of FIG. 4 with the layed up layers of composite material in place;

FIG. 9 is sectional view through 9—9 of FIG. 4;

FIG. 12 is a plan view of a third embodiment of the former of the invention;

FIG. 13 is sectional view through 13—13 of FIG. 12;

FIG. 14 is a side elevation of the former of FIG. 12;

FIG. 15 is a perspective view illustrating the compound curving of the oblong former elements;

FIG. 16 is a sectional view through 16—16 of FIG. 12 illustrating the cross-venting from rib to rib when layed up in a core sandwich construction;

FIG. 17 is a sectional view of 17—17 in FIG. 12;

FIG. 18 is a sectional view through 18—18 of FIG. 12;

FIG. 19 is a sectional view through 19—19 of FIG. 12;

FIG. 22 is a similar sectional view to FIG. 19 illustrating details of bonding and venting using a pasty slurry;

FIG. 23 is a sectional view through 23—23 of FIG. 12 using a pasty slurry;

BEST MODES FOR CARRYING OUT THE INVENTION

Figure 1:
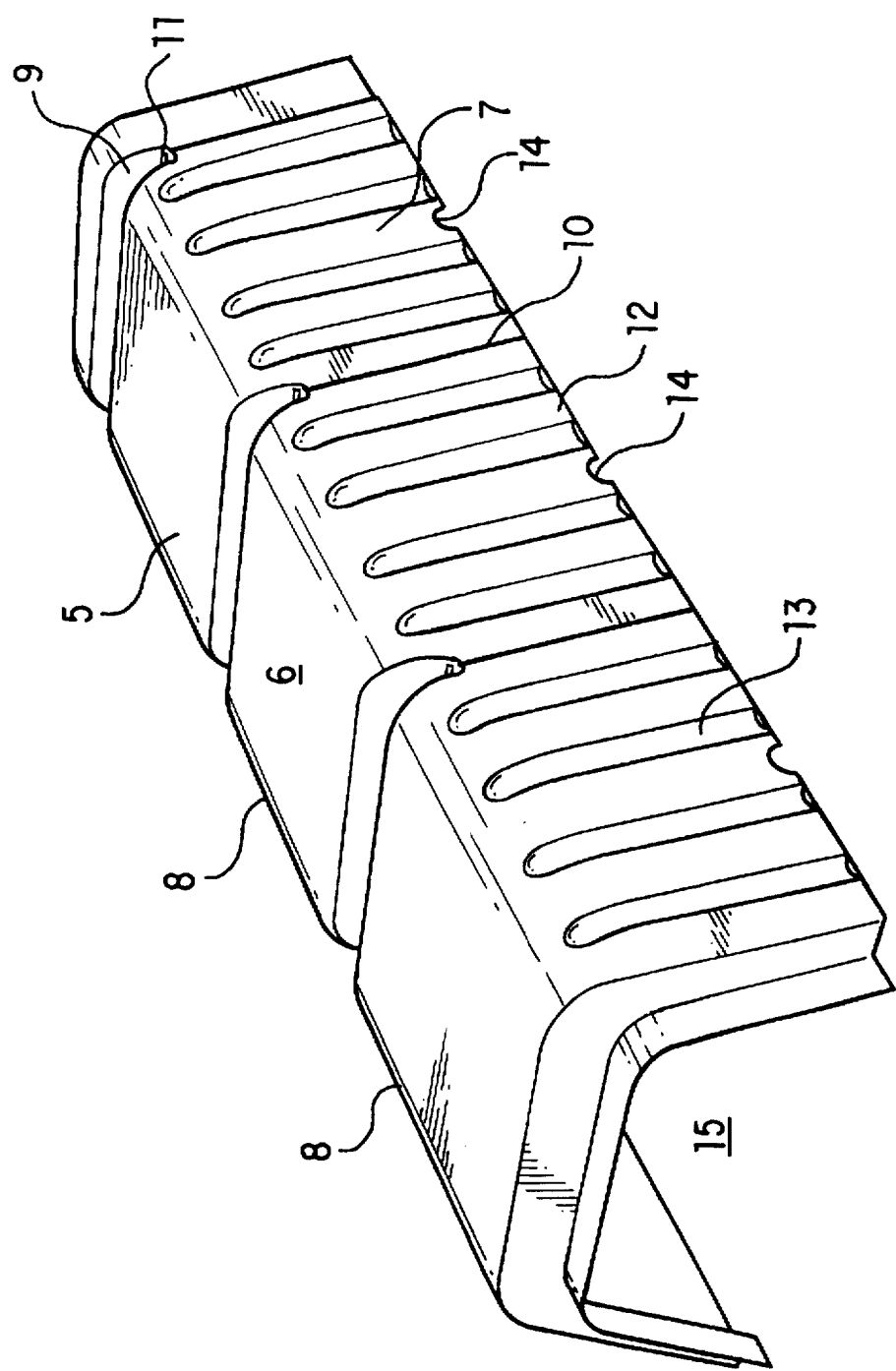
FIG. 1 is a perspective view of on embodiment of a rib section according to the invention.

Referring to the drawings, FIGS. 1 to 3 show a first embodiment of the rib section 5 of the invention. The rib section 5 is generally arch-shape in cross-section, as best shown in FIG. 1, having a generally level upper surface 6 and flaired sidewalls 7. The rib section 5 is divided into a number of sub-sections 8 by transverse grooves 9 formed at spaced intervals along the section 5. The grooves 9 widen towards their openings and are generally V-shaped. Slits 10 are formed in the sidewalls 7 between the base 11 of each groove 9 and the base 12 of the rib section 5.

The shape of the grooves and the slitted sidewalls enables the rib section to flex or bend about the base of each groove, as best shown in FIG. 2.

The sidewalls 7 are further provided with a series of vertically extending flutes, depressions or grooves 13 which serve to rigidify the walls in a longitudinal direction. The sidewalls 7 may also have formed in the base 12 a vent opening 14 to allow venting to the interior 15 of the rib section 5. One end 16 of the rib section 5 is provided with a joining flange 17 while the other end 18 is provided with a mating lip 19 which rests on the flange 17 and overlaps the upper surface 6 of the rib section 5, as best shown in FIG. 3. This enables desired lengths of section to be formed from any number of joined rib sections.

Figure 7:
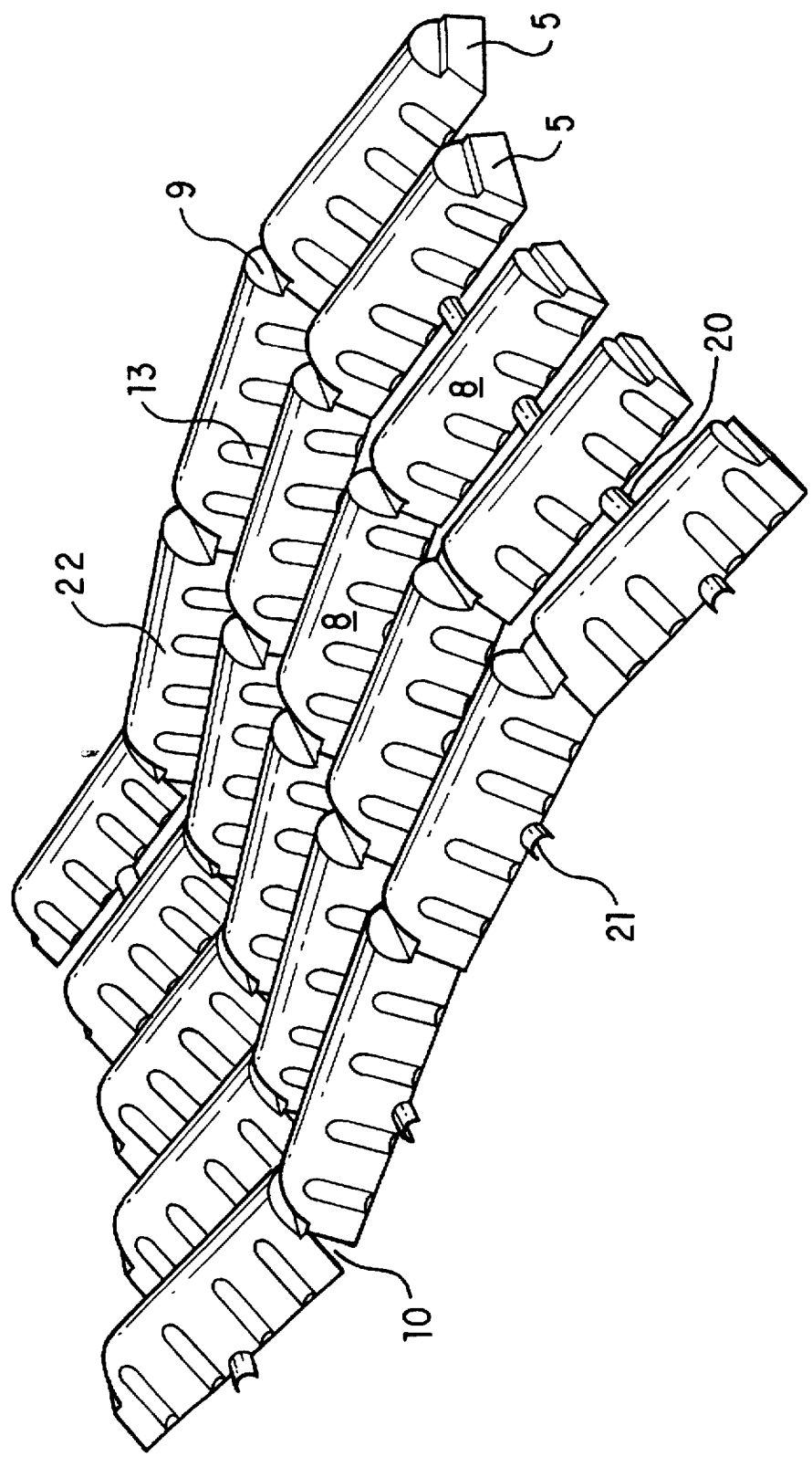
FIG. 7 is a perspective view of the former of FIG. 4 flexed to a complex shape.

FIGS. 4 to 7 show a second embodiment of the former according to the invention wherein a number of rib sections 5 are arranged in a parallel formation to form a sheet 22. The adjacent parallel rib sections 5 are joined at spaced locations by a bridge portion or web 20 which is preferably located at a point mid way along the base of each sub-section 8. The bridge portion 20 is preferably arcuate or angular in cross-section to provide a venting channel 21 between the sub-sections 8 in use. This arrangement produces a former sheet 22 which may be flexed to produce complex curves and shapes as shown in FIG. 7.

Figures 4, 6:
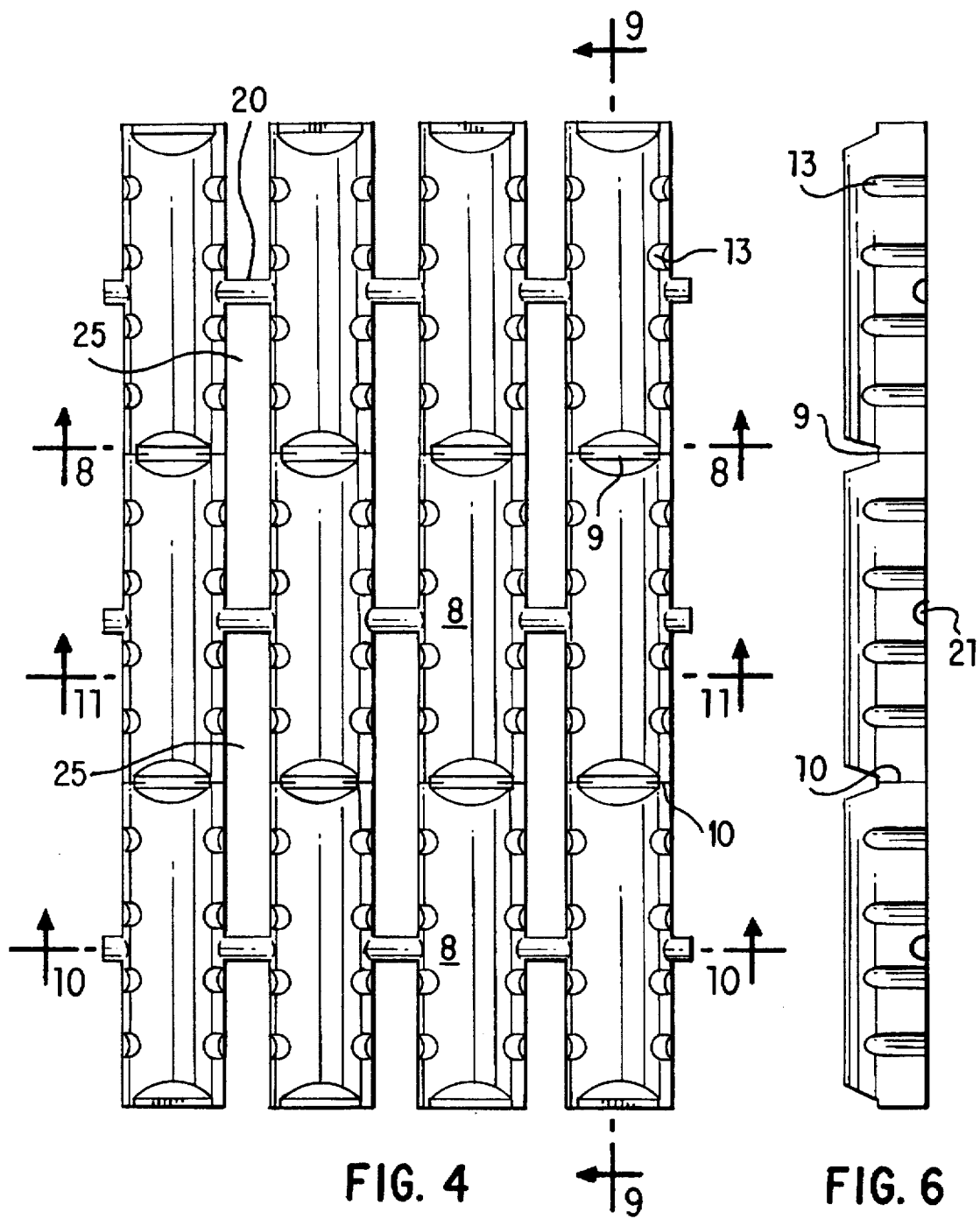
FIG. 4 is a plan view of a second embodiment according to the invention.
FIG. 6 is a side elevation view of the former of FIG. 4.
Figure 5:
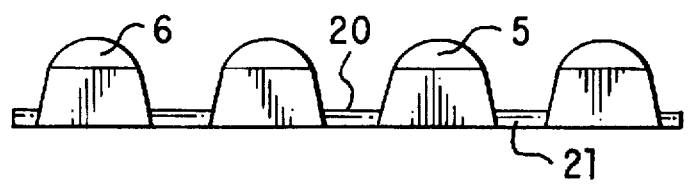
FIG. 5 is an end elevation view of the former of FIG. 4.
Figure 10:
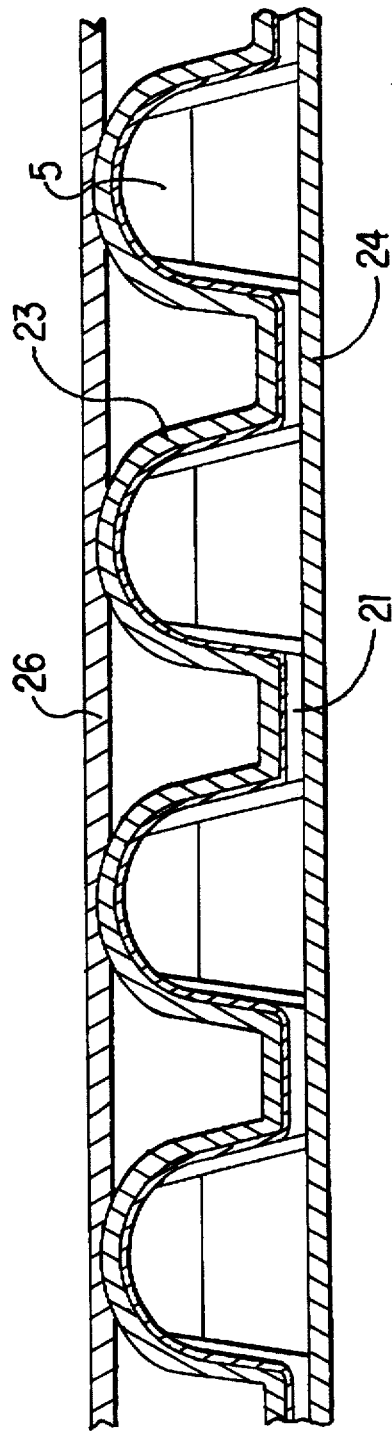
FIG. 10 is sectional view through 10—10 of FIG. 4.
Figure 11:
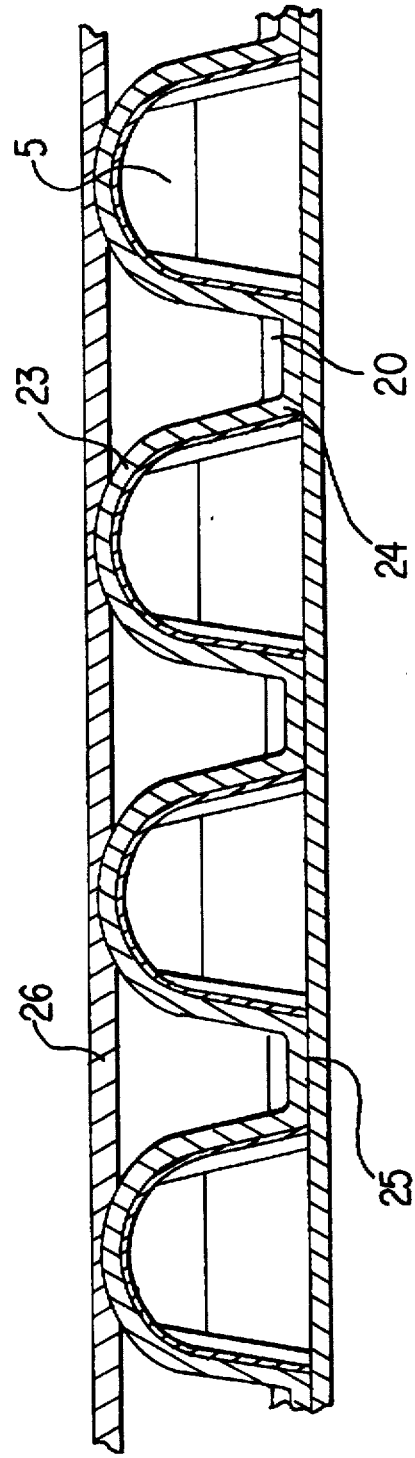
FIG. 11 is sectional view through 11—11 of FIG. 4.

FIG. 8 shows an end section taken on lines 8—8 of FIG. 4 with the layed up plastic composite material in position. A bonding layer 23 of reinforced composite material is pushed down between the rib sections 5 to bond with the lower layer 24 through openings 25 between the parallel rib sections 5. The upper layer 26 of the composite material is not pushed down between the rib sections 5 but is supported on the upper surfaces 6 of each rib section to provide a cell-like structure. The upper layer 26 is bonded to the previously layed up bonding layer 23. FIG. 9 shows a side section taken on lines 9—9 of FIG. 4. FIG. 10 shows a section taken on line 10—10 of FIG. 4 illustrating the venting channel 21 in a layed up core sandwich panel. FIG. 11 shows a section taken on line 11—11 of FIG. 4 showing the bonding through opening 25 in the layed up core sandwich panel.

Referring to FIGS. 12 to 23, a further embodiment of the invention is shown where the groove 9 extends all the way to the base 11 of the rib section 5. The groove 9 is generally V-shaped in cross-section with the base of V, 27 defining a hinge portion between each sub-section 8. A venting channel 21 is provided between the rib sections in a similar fashion to the earlier embodiment. An additional venting channel 28 is provided through the base 27 of the groove 9 to allow for venting between the sub-sections 8 of the rib section 5.

FIGS. 16 to 19 again show sections through the former sheet 22 with the layers (23,24,26) of the composite material layed up in position to form a core structure.

Figure 20:
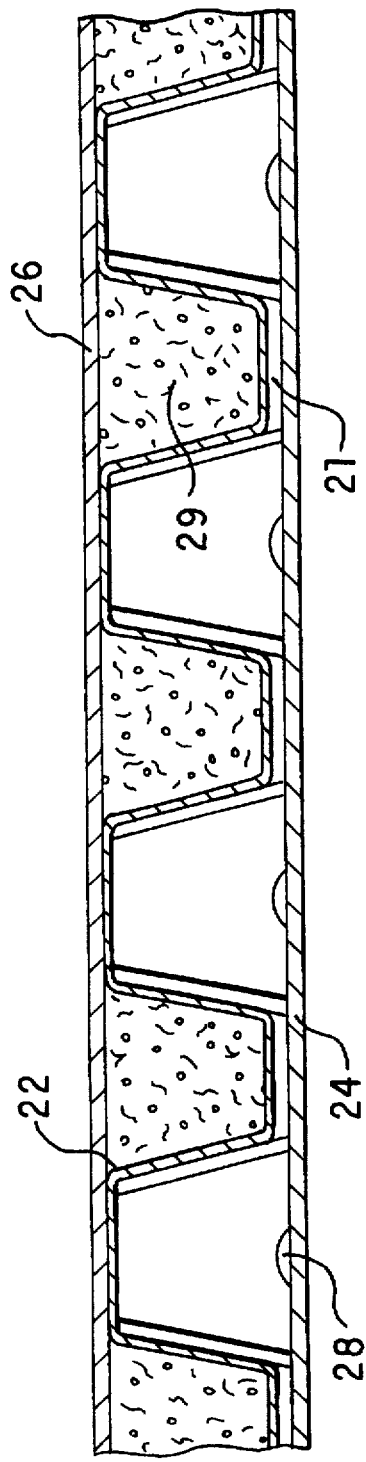
FIG. 20 is a similar sectional view to FIG. 16 illustrating details of bonding and venting using a pasty slurry.
Figure 21:
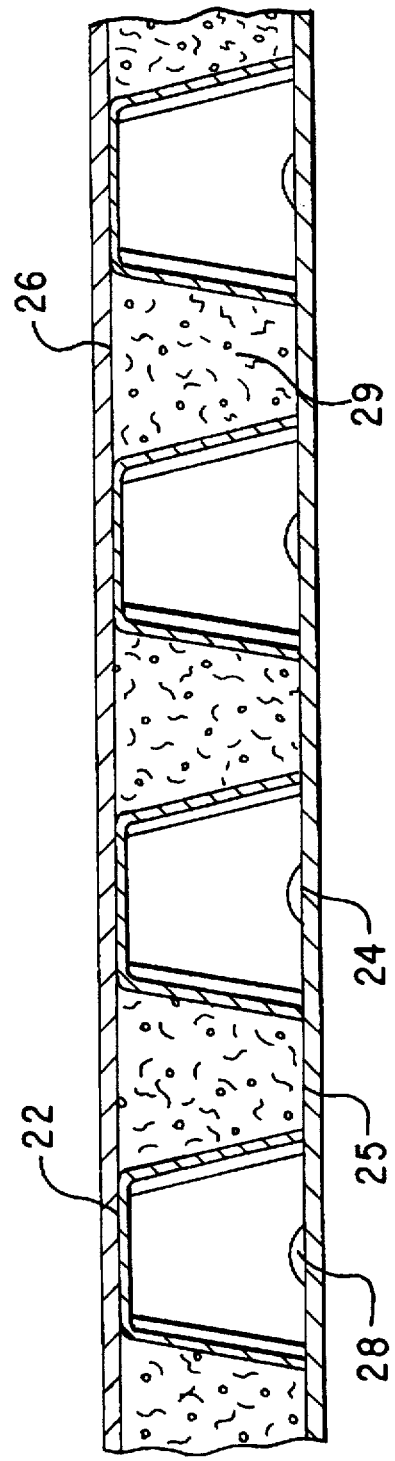
FIG. 21 is a similar sectional view to FIG. 17 illustrating details of bonding and venting using a pasty slurry.
Figure 24:
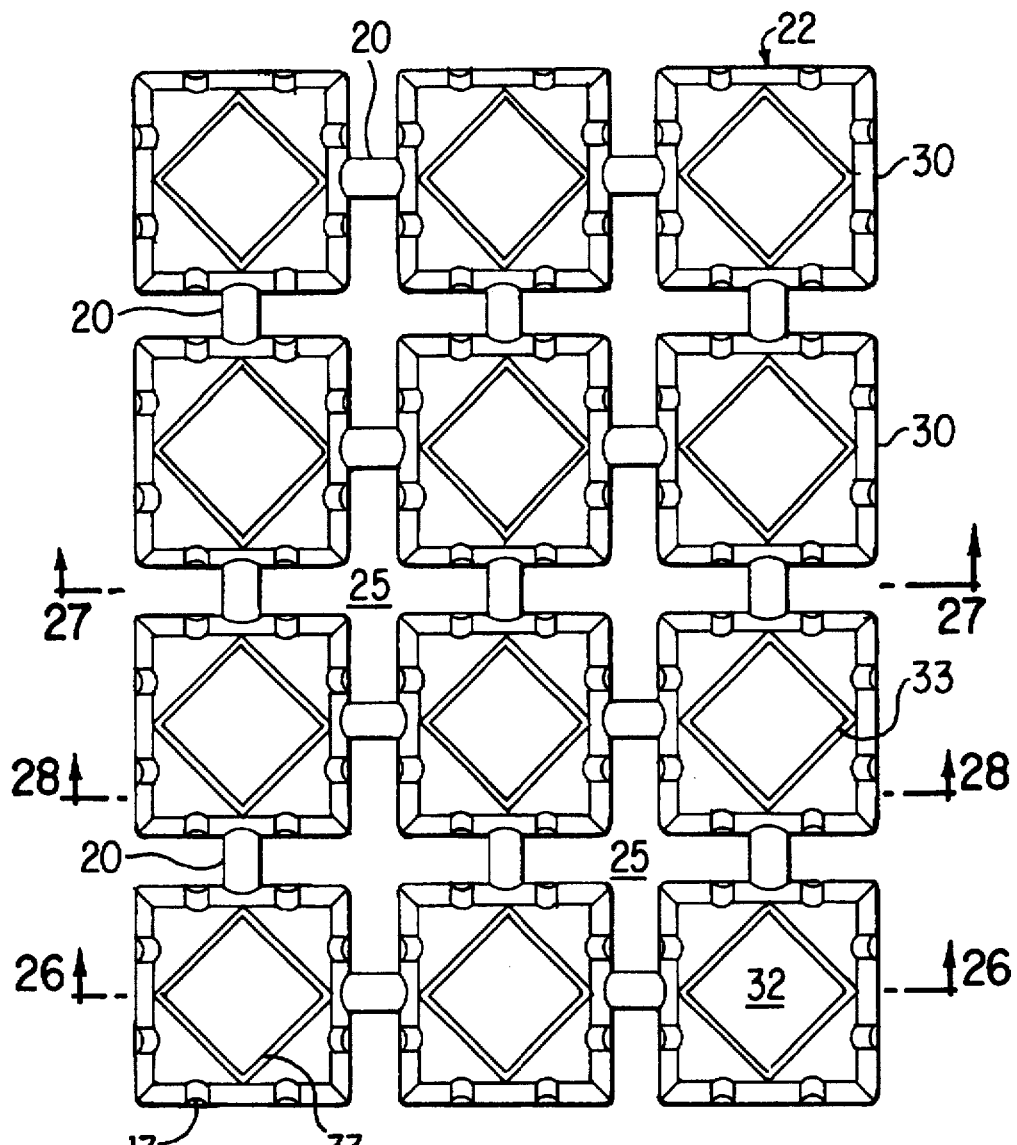
FIG. 24 is a plan view of the former according to a fourth embodiment of the invention.
Figure 25:
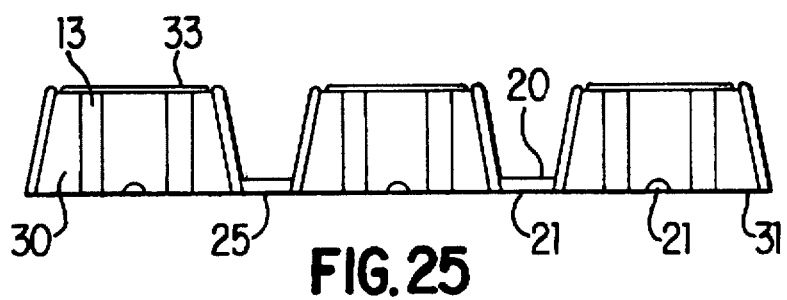
FIG. 25 is an end elevation of the former of FIG. 24.
Figure 26:
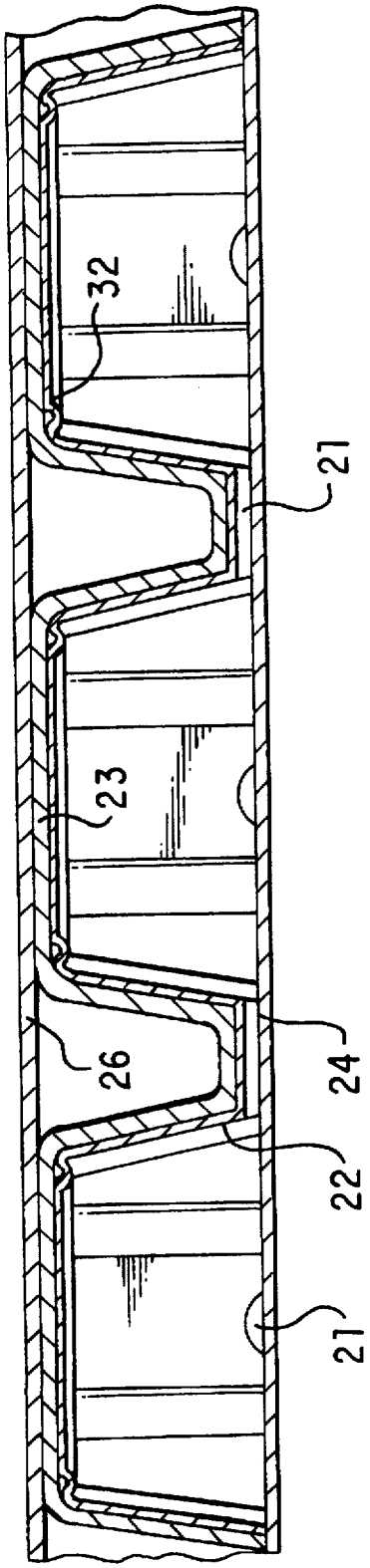
FIG. 26 is a sectional view through 26—26 of FIG. 24 to illustrate the venting between the cells when layed up in a core sandwich panel.
Figure 27:
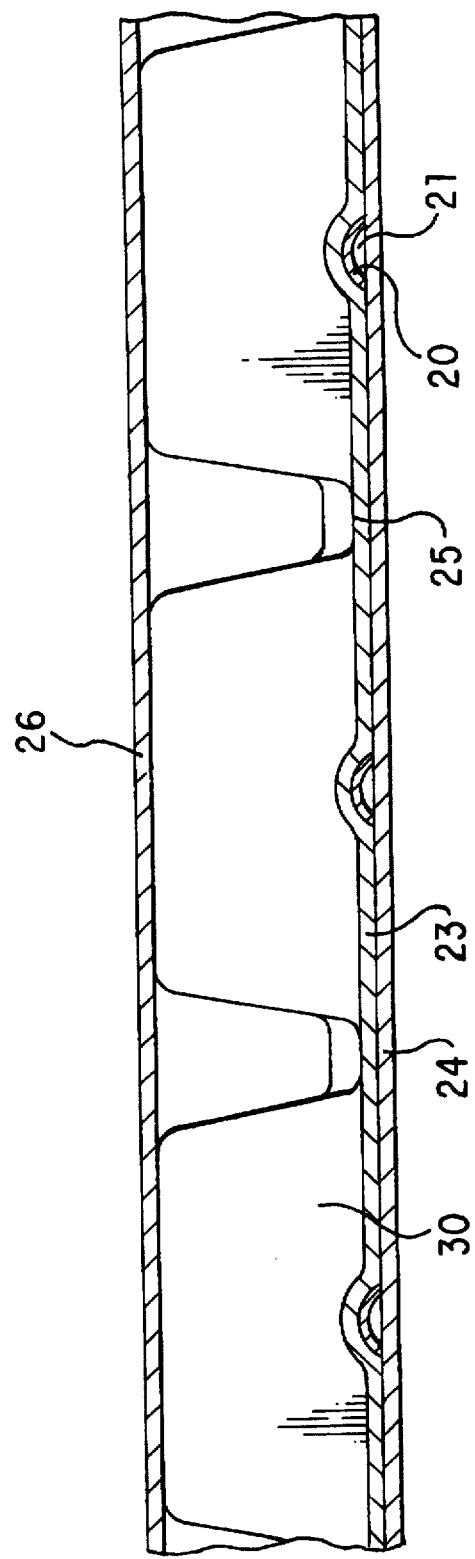
FIG. 27 is a sectional view through 27—27 of FIG. 24 which indicates the cut-out area in the core former where the bonding between the core and the inner panel moulding takes place.

FIG. 20 and 21 illustrate the use of a pasty slurry 29 with optional lightweight filler and reinforcing fibres used with the former 22 to create a core structure bonding to the upper layer 26 in a similar manner to that shown in FIG. 16. FIGS. 22 and 23 again show the use of a pasty slurry but illustrate that the slurry does not bond to the lower layer 24. Bonding can occur to the lower layer if desired by providing appropriate cut-outs in the former sheet. This pasty slurry 29 is used instead of the bonding layer shown in FIG. 16.

FIGS. 24 to 29 illustrate a further embodiment of the present invention. In this embodiment the former sheet 22 comprises an array of upstanding formations or cells 30 each joined at their base 31 by a flexible bridge portion 20.

Figure 28:
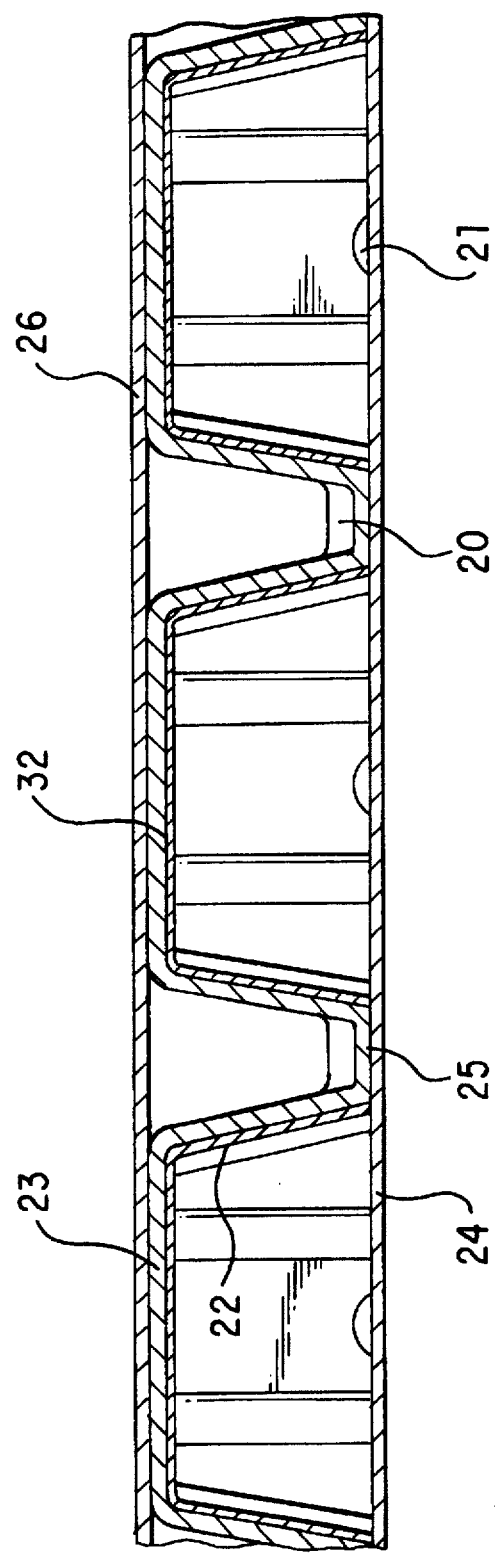
FIG. 28 is a sectional view through 28—28 of FIG. 24 showing the bonding area on the other axis when layed up in a core sandwich panel.

Preferably, the bridge portions 20 are arcuate or angular in cross-section to provide a venting channel 21 between each cell 30 as in other embodiments. The upper surface 32 of each cell 30 is a generally level land having stiffening formations in the form of grooves or ridges 33. The area between the base 31 of each cell and the bridge portion 20 is cut-out to form openings 25 in sheet to allow bonding between a base layer of composite material 24 and a bonding layer 23 as best shown in FIG. 28. An upper layer 26 of composite material may then be layed-up over the bonding layer 23 to produce a core structure in a similar fashion to other embodiments. It will be appreciated that the bridge portion 20 may be located at any level between the cells and the position illustrated in the drawings is merely preferred.

Figure 29:
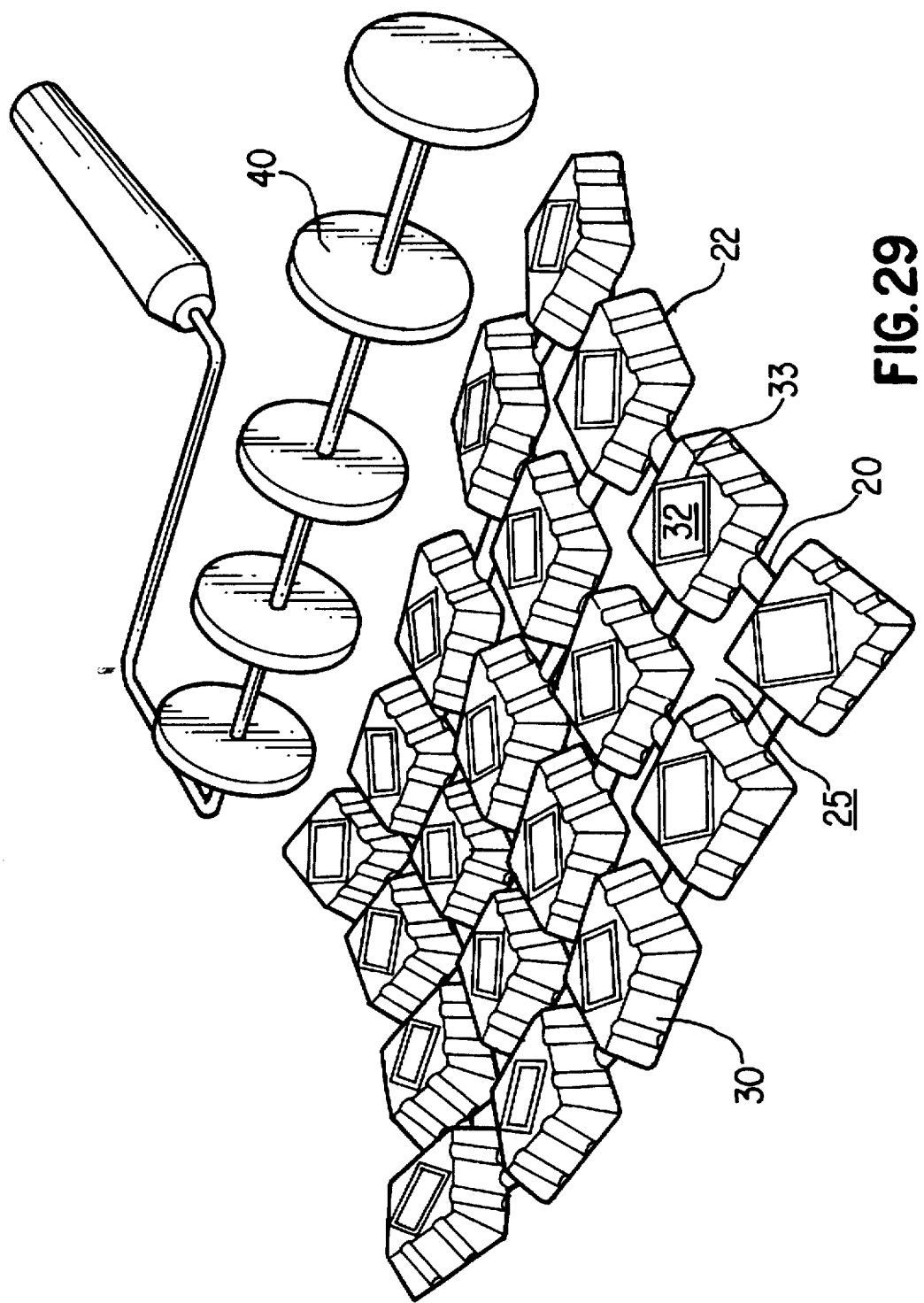
FIG. 29 is a perspective view of the former and a multi twin disk roller that is used to push the reinforced composite layer down around the former cells to bond on the lower surface of the moulding.

As the cell structure of the sheet is symmetric in both directions the rigidity of the eventual core structure can be controlled. Normally the bonding layer 23 would be rolled down in both directions using a roller 40 as shown in FIG. 29. This would provide a core structure which would provide rigidity in both X and Y directions by bonding through openings 25. However, if the procedure is applied by rolling down to the lower surface in one direction only, rib sections are formed. The geometric configuration of the cells, that is, oblong, circular, hexagonal, etc. does not alter the principle of the invention. By changing the geometric configuration, and/or using the roller in one direction only, the rigidity of the structure on the X and Y axis can be altered to suit the application.

The abovementioned drawings have illustrated that the venting between the cells has taken place on all four sides of the cells. However, it will be appreciated that this venting may not be necessary on all four sides or at all for some applications.

It is important to note that the bonding of the inner and outer surfaces to the core material does not take place through using the surface or faces of the former (represented by the numbers 5,22 in the drawings), but through the means of the cut-outs 25 or exposed resinous surfaces of the formed core structures.

In consideration of the global concern to seek ways of reducing pollution and contamination, and the enactment of worldwide legislation to that end, this invention seeks to deal with these important issues by creating a simple and economic method of testing the integrity between the inner and outer surface of panels, vessels and containers in order to pinpoint leakage.

The former element 5,22 is in itself very lightweight and thus adds a minimal increase of weight to the moulding or panel.

The former element 5,22 being of lightweight, readily adheres to the first layer 24 even when placed on a vertical surface before it "sets up". When the resin moulding or panel has set up, the former element is firmly held in place, facilitating the laying up of composite resin (23 or 29) on or around the former element 5,22 completing with the outer layer or panel 26.

The former element 5,22 can be made of material that has virtually no absorption qualities. If a rupture does occur on one or both of the outer mouldings or panels 26 the core material does not swell, nor does it cause the moulding or panel to swell. Thus, the weight or shape of the structure will not increase provided the draining facility is used.

The present invention provides an economical, efficient and simple method to form and shape a core material of composite reinforced plastic which is flexible enough to follow compound curves. This unique method enables a core structure to be created between the inner and outer surfaces of the mouldings or panels. This may be layed up in a continuous or discrete process, or bonded to panels or mouldings previously created. Any material may be used for the inner or outer mouldings or panels.

I claim:

1. A former for use in a core sandwich of composite reinforced plastics material, the former comprising a plurality of transversely displaced parallel rib sections each of said rib sections jointed to adjacent and transversely displaced rib sections by a flexible bridge portion to define through openings in the former between each bridge portion and the rib sections, each rib section being divided into a plurality of sub-sections by a depression or groove formed in an upper surface of the rib section, the base of the groove forming a hinge or web section between each adjacent sub-section and having slits or openings in the side walls of the rib section extending between the base of the rib section and the base of each groove.

2. A former according to claim 1 wherein the former is integrally formed.

3. A former according to claim 1 wherein the bridge portion is shaped to provide a venting channel between adjacent rib sections.

4. A former for use in a core sandwich of composite reinforced plastics material, the former comprising a sheet having a two dimensional array of upstanding formations formed therein and each joined to an adjacent formation by a flexible bridge portion to define through openings in the sheet of the former between each bridge portion and the upstanding formations.

5. A former according to claim 4 wherein one or more of said bridge portions are shaped to provide a venting channel between adjacent formations.

6. A former according to claim 4 wherein walls of the formations are provided with stiffening formations.

7. A former for use in a core sandwich of composite reinforced plastics material, the former comprising a plurality of parallel rib sections each joined to adjacent rib sections by a flexible bridge portion to define through openings in the former between each bridge portion and the rib sections, each rib section being divided into a plurality of sub-sections by a depression or groove formed in an upper surface of the rib section and extending to the base of the rib section, the base of the groove forming a hinge or web section between each adjacent sub-section.

8. A former according to claim 7 wherein the former is integrally formed.

9. A former according to claim 7 wherein a venting channel is provided between the sub-sections through said hinge section.

10. A former according to claim 1 or 7 wherein walls of the rib sub-sections are provided with stiffening formations.

11. A former according to claim 1 or 7 wherein the ends of the former are shaped to enable joining in a complementary fashion with the ends of further like formers.

12. A former according to claim 1 wherein the base of the groove or depression is spaced from the base of the rib section to provide a venting channel between adjacent rib sections.

13. A former according to claim 1 wherein the bridge portion is formed by further openings formed in the base of the groove or depression and extending from the defined openings part way through the length of said groove or depression.

14. A former according to claim 4 wherein the upstanding formations are hexagonal, oblong or circular in shape.

15. A former according to claim 1 or claim 7 wherein the subsections are hexagonal, oblong or circular in shape.

16. A core sandwich of composite reinforced plastics material incorporating a former according to claim 1, 4 or 7.

* * * * *